United States Patent [19]

Koyanagi et al.

[11] 4,420,749

[45] Dec. 13, 1983

[54] CHARGE TRANSFER TYPE ELECTROCHROMIC DISPLAY DEVICES

[75] Inventors: Katubumi Koyanagi; Hiroshi Hamada, both of Nara; Kohzo Yano, Yamatokoriyama; Hiroshi Take, Ikoma; Yasuhiko Inami, Nara, all of Japan

[73] Assignee: Sharp Kabushiki Kaisha, Osaka, Japan

[21] Appl. No.: 276,970

[22] Filed: Jun. 24, 1981

[30] Foreign Application Priority Data

Jun. 30, 1980 [JP] Japan .................................. 55-89847

[51] Int. Cl.³ ............................................. G09G 3/16
[52] U.S. Cl. ..................................... 340/763; 340/785; 340/812; 350/357
[58] Field of Search ............... 340/763, 785, 812, 813; 350/357

[56] References Cited

U.S. PATENT DOCUMENTS

| 4,210,907 | 7/1980 | Hamada et al. ................. 340/763 X |
| 4,295,138 | 10/1981 | Nakauchi et al. .................... 340/785 |
| 4,322,133 | 3/1982 | Uede et al. ...................... 340/785 X |

FOREIGN PATENT DOCUMENTS

54-49099 4/1979 Japan .................................. 340/785

*Primary Examiner*—David L. Trafton
*Attorney, Agent, or Firm*—Birch, Stewart, Kolasch & Birch

[57] ABSTRACT

An electrochromic display device is characterized by comprising a counter electrode, opposed to a plurality of display segmented electrodes, for absorbing a charge present in some colored display segments. Thereafter, the counter electrode provides a refreshing charge to said some segments from which charge has been taken off. A total amount of charge, defined as the amount of charge necessary for coloring all the display electrodes, is kept constant by refreshing.

11 Claims, 6 Drawing Figures

CHARGE TRANSFER TYPE ELECTROCHROMIC DISPLAY DEVICES

BACKGROUND OF THE INVENTION

1. Field of the Invention

The present invention relates to an electrochromic display devices using an electrochromic material such as $WO_3$, $MoO_3$, viologen etc. and, more particularly, to a construction and a driving method of such electrochromic display devices.

2. Description of the Prior Art

Japanese Published Unexamined patent application No. 53-17090 published Feb. 16, 1978 discloses a charge transfer driving system characterized in that erasing voltage is applied to one or more colored display electrodes made of an electrochromic material, the amount of charge of the erasing voltage corresponding to the coloration depth of the colored display electrodes, and characterized in that that no current flows after completion of erasure so as to prevent further application of charge. By virtue of this function, the voltage applied to a plurality of charges for coloration of the display electrodes is intended to be kept constant as long as the applied voltage is less than a voltage which would cause undesirable reaction such as resolution of the electrolyte, etc.

However, it is difficult to accurately keep the total amount of charge for coloration constant, in particular, under an elevated temperature, so that the total amount diminished to thereby make coloration depth of the display electrodes fade, gradually.

SUMMARY OF THE INVENTION

Accordingly, it is an object of the present invention to provide an improved electrochromic display showing stable coloration depth of display electrodes.

It is another object of the present invention to provide an improved electrochromic display keeping a total amount of charge for coloration of display electrodes constant for a long time.

It is a further object of the present invention to provide an improved electrochromic display of the charge transfer type comprising a counter electrode.

Briefly described, an electrochromic display device of the present invention is characterized by comprising a counter electrode, opposed to a plurality of display segmented electrodes, for absorbing a certain charge amount present in some colored display segments. Thereafter, the counter electrode provides a certain amount of refreshing charge to some segments from which charge has been taken off. A total amount of charge, that amount of charge necessary for coloring all the display electrodes, is kept constant.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figures 1A, 1B:
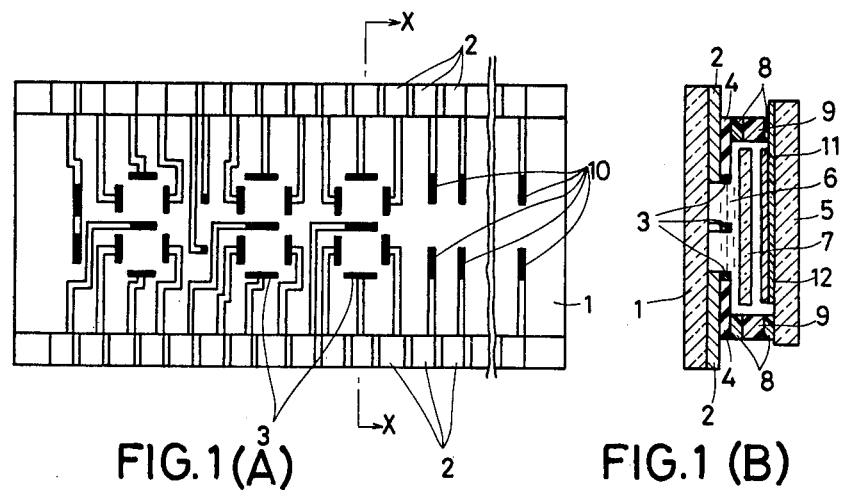
FIG. 1(A) shows a plan view of an electrochromic display cell according to the present invention.
FIG. 1(B) shows a cross-sectional view taken on the line X—X of FIG. 1(A)

Referring now to FIGS. 1(A) and 1(B), an electrochromic display cell of the present invention comprises a transparent front substrate 1, a transparent and conductive film 2, and a layer of an electrochromic material 3. The film 2 such as $In_2O_3$ etc. is disposed on the substrate 1. The layer 3 is formed as a plurality of display elctrodes or segments. An insulating film 4 such as $SiO_2$ etc. is formed on the remaining portion except for the display electrodes of the film 2. Together with the thus prepared front substrate 1, a counter substrate 5 forms a cavity having an electrolyte 6, and an opaque background material 7. Another transparent and conductive film 12 is disposed on the counter substrate 5.

The two substrates are bonded to each other with sealing members 8 and spacers 9. The electrolyte 6 is preferably a solution of $\gamma$-Butyrolactone containing a 1-molar/l lithium perchlorate. The opaque background material 7 comprises a porous ceramic, preferably.

One or more additional electrodes 10 are formed on the film 2 on the substrate 1. Alternatively the electrodes 10 may be disposed on the surface of the film 12 on the substrate 5.

Regardless of whether the additional electrode 10 is formed on the substrate 1 or the substrate 5, a layer of electrochromic material which is the same as that for the display electrodes is used to form the additional electrodes 10 to show identical electrochemical properties with those of the display electrodes.

As a feature of the present invention, a counter electrode 11 is formed as a film which is prepared by evaporation, sputtering or the like. It is disposed on the surface of the film 12. The counter electrode 11 is made of $WO_3$ doped with $SnO_2$ of, for example, about 3 to 5 weight %. The dimension of this electrode 11 is selected so that it can supply some display segments 3 to be colored and some additional electrodes 10 with charge necessary for coloring the display segments 3.

Figure 2:
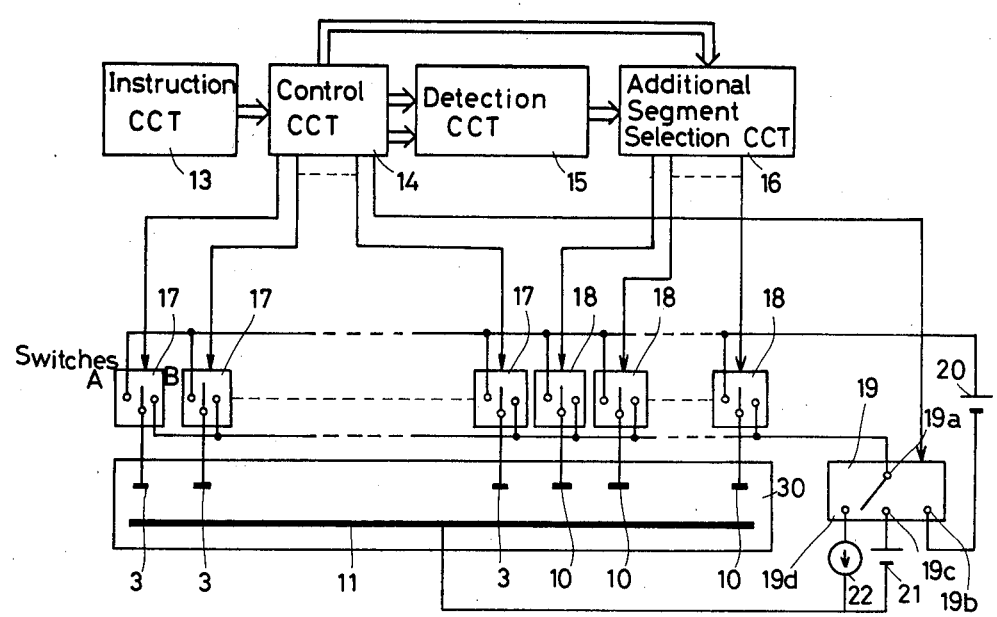
FIG. 2 shows a block diagram of a driver for driving the display cell of FIG. 1(A)

FIG. 2 shows a block diagram of a driving circuit for driving the above-described electrochromic display designated as 30. The driving circuit enables the so-called charge transfer driving in which a constant voltage is applied between display electrodes to be colored and display electrodes to be erased.

More particularly, when a certain number of display electrodes or segments are to be colored and other display segments are to be erased, a constant voltage is applied and charge is transferred from the segments to be erased to the segments for coloration. Thus, a chosen display by the colored display electrodes and the erased display electrodes is enabled.

The driving circuit of FIG. 2 comprises an instruction circuit 13, a control circuit 14, a detection circuit 15, an additional segment selection circuit 16, a plurality of electronic switches 17 and 18, a power switch 19, constant voltage sources 20 and 21, and a constant current source 22.

The instruction circuit 13 preferably includes an oscillator, a divider, and a decoder. It develops instruction signals applied to the control circuit 14, the signals commanding a particular display by some display segments 3. The control circuit 14 includes preferably a micro-computer circuit. It controls switching of the electronic switches 17 and the power switch 19. Further, it forwards data of the number of display segments to be colored and of the number of display segments to be erased, in each particular changing display pattern, to the detection circuit 15. Still further, it determines which of the additional electrodes 10 is placed in coloration or in erasure. This data is sent to the additional segment selection circuit 16.

The detection circuit 15 is responsive to the data from the circuit 14 for detecting the difference in the number of display segments to be colored and ones to be erased. Further, it detects which of the number of display segments to be colored and the number of ones to be erased is larger. The detected data is applied to the additional segment selection circuit 16.

The circuit 16 is responsive to the data from the circuit 14 and 15 for selecting a certain number of additional electrodes 10 by switching some of the electronic switches 18.

As described above, the display cell 30 contains the display segments 3, the additional electrodes 10, and the counter electrode 11 as electrically conductive components. The electronic switches 17, which may be analog switches are coupled to the display segments 3, respectively. The electronic switches 18, which may be analog switches, are connected to the additional electrodes 10, respectively. As shown in FIG. 2, all the terminals referred to as A of the switches 17 and 18 are connected in common while all the terminals referred to as B of the switches 17 and 18 are connected in common. The terminals A are connected to the positive pole of the constant voltage source 20 and terminals B are connected to a terminal 19a in the power switch 19.

This power switch 19 comprises an analog switch. The switch 19 additionally has three terminals 19b, 19c and 19d. Terminal 19a is connected to any of the three terminals 19b, 19c, and 19d. The terminal 19b is connected to the negative pole of the constant voltage source 20. The terminal 19c is tied to the positive pole of the constant voltage source 21. The negative pole of the source 21 is led to the counter electrode 11. The terminal 19d is connected to the counter electrode 11 through the constant current source 22.

The driving circuit of FIG. 2 has two operation modes, a normal display mode and a refreshing driving mode by which the total charge for coloration is kept constant. The refreshing driving mode constitutes the crux of the present invention.

(I) The Normal Display Mode

The terminal 19a is connected to the terminal 19b. In order to color some display segments 3, the terminals B of the switches 17 are connected to the segments 3 to be colored, respectively. The terminals A of the switches 17 are connected to the segments to be erased, respectively. The source 20 supplies them power energy for coloration and erasure.

When the number of the display segments 3 to be colored is larger then the number of the display segments 3 to be erased, the terminals A of a number of switches 18 associated with the additional electrodes 10 are connected, the number of which is identical with the difference in number between the display segments to be colored and ones to be erased. On the contrary, when the number of the display segments 3 to be colored is less than the number of the display segments 3 to be erased, a number of terminals B of the switches 18 are connected to the additional electrodes 10, the number of which is identical with the difference in number between the display segments to be colored and ones to be erased.

Thus, the additional electrodes 10 are provided so that the total of the colored display segments and the colored additional electrodes is kept constant by increasing or decreasing the number of the additional electrodes to be colored, depending on the increase or decrease of the number of the display segments to be colored.

(II) The Refreshing Driving Mode

Each of the colored display segments 3 and the colored additional electrodes 10 is connected to each of the terminals B in the switches 17 and 18. The terminal 19a is connected to the terminal 19c. Hence, the constant voltage source 21 absorbs charge present in the colored display segments 3 and the colored additional electrodes 10 through the counter electrode 11. All the display segments 3 and the additional electrodes 10 are erased.

Thereafter, terminal 19a is connected to terminal 19d. Hence, charge from the constant current source 22 is introduced through the counter electrode 11 to the display segments 3 and the additional electrodes 10 from which charge has just been removed. Thus, a constant total charge for coloration is renewed even if it is reduced by bleaching or leakage through the circuit.

During this refreshing driving mode, other display segments 3 and other additional electrodes 10 apart from any coloration are made open by opening the respective switches 17 and 18.

As described above, the total area of the colored display segments 3 and the colored additional electrodes 19 is kept constant, independent of the display pattern. As a result, in order to give a constant coloration depth of the refreshing display segments and the refreshing additional electrodes, it is enough to supply a constant current for a certain time. It is unnecessary for the current value of the constant current source 22 to be varied depending on the display pattern to be enabled.

According to our experiments, a counter electrode 11, made of $WO_3$ doped with $SnO_2$ of about 3-5 weight %, has the capability of holding charge of about 5 $mC/cm^2$ after placed in the environment of about 70° C. for a time of about 1,000 hours. In order to provide substantially a constant and stable display, it is sufficient that the colored display segments 3 and the colored additional electrodes 10 are subjected to the refreshing driving mode about once every 30 minutes.

The driving circuit of FIG. 2 enables erasure of the display segments by using a constant voltage and enables coloration of them by using a constant current, during the refreshing driving mode. This provides an advantage that as a constant current is set for coloration, a constant contrast display is renewed even if the voltage of the counter electrode 11 is varied.

Regardless of changing temperature in the environment, a constant contrast display is renewed.

The counter electrode for providing a stable voltage enables a simplified constant voltage source for coloration and erasure. Low power dissipation can be expected and the device is suitable for a battery powered electroluminescent display. Such an example is described blow.

Figure 3A:
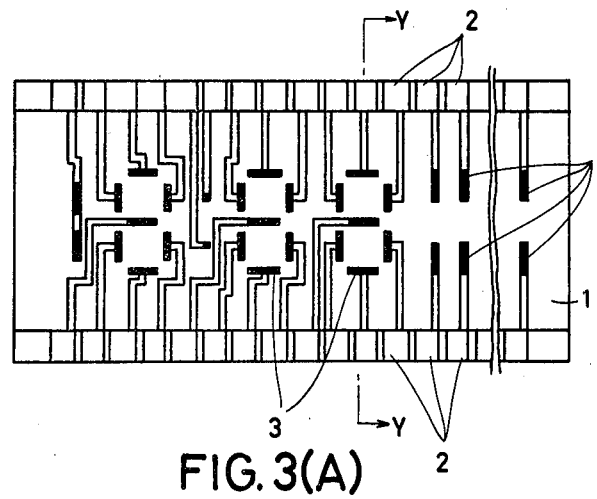
FIG. 3(A) shows a plan view of another electrochromic display cell according to the present invention.
Figure 3B:
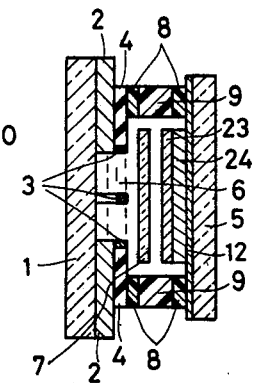
FIG. 3(B) shows a cross-sectional view taken on the line Y—Y of FIG. 3(A)

With reference to FIGS. 3(A) and 3(B), another specific electrochromic display cell according to the present invention is indicated. Like elements corresponding to those of FIGS. 1(A) and 1(B) are represented by like numerals.

As a feature of this embodiment of the present invention, the counter electrode is prepared by the pressure molding of a mixture of powder of a solid redox type active material and another powder of a conductor.

The solid redox type active material is selected from the following groups:
(1) Mg, Al, Zn, Cr, Fe, Ni, Sn, Pb, Tl, Ti, Zr, Ce, In in which an electrolyte is selected to be a solution consisting of an acid, a salt solved in a solvent such as water or an organic solvent, and a solution of KC, or the like, typically, a solution of lithium perchlorate in γ-Butyrolactone, or sulphuric acid.
(2) a halogenide of a metal, sulfate, nitrate, perchloric acid, preferably, $NiF_2$, $NiCl_2$, $CuF_2$, $CuCl_2$, AgCl.
(3) homogeneous phase redox system including an oxide, sulfide or selenide of a metal, preferably, $WO_3$, CuS, CuSe, FeS, FeSe, MoOx, WOx (in which x is more than 1 and not more than 3), tungsten bronze, and $Nb_2Ox$ (x is more than 2 and not more than 5).
(4) heterogeneous phase redox system including $RFe(II)[Fe(III)(CN)_6]$ (in which R stands for $NH_4$, H, K or Na), i.e., Prussian blue, a metallophthalocyanine complex, an iron complex, a cobalt complex, or another transition metal complex.

A single compound is usually used, but it is also possible to use a mixture of two or more compounds if required.

The above-noted materials for the counter electrode provide the following advantages:
(1) No high overpotential is shown: If high overpotential shows, it leads to a disadvantage that a value of a voltage applied to the counter electrode would become high.
(2) It permits a stable current for a long period.
(3) Even if a production is made as a result of a reaction, it does not damage the display electrodes.

The powder of a conductor for use according to this invention may be carbon, more specifically of expanded graphite, active carbon, graphite or carbon black. Expanded graphite or active carbon is particularly preferable.

A powder of a solid oxidation-reduction active material and that of a conductor should have a mixing ratio by weight of about 1:0.8 to 100, and more preferably 1:1 to 20. These powders preferably have a grain size not greater than 300 mesh in accordance with the Japanese Industrial Standards. The application of pressure may be effected by a hydraulic press having a capacity of, say, 5 tons/cm$^2$, or by rolling to form a plate.

As a specific example, the solid redox type active material is selected to be $MnO_2$ and the conductor is selected to be expanded graphite, a commercial type "EXP-F200" produced by Nippon Graphite, Japan. The thus prepared counter electrode 23 has a specific resistance of less than 0.1 ohm-cm, and shows a polarization in the electrolyte 6 of less than 10 ohm per cm$^2$ under normal conditions.

According to the experiments conducted by the inventor, the electrode 23 maintained stability in its reversible potential during both the development and erasure of a color, (i.e., at the counter electrode 23 during its oxidation and reduction) and even when it was left to stand at a high temperature of 70° C.

Expanded graphite may be obtained if graphite is immersed in a mixed solution of sulfuric and nitric acids, washed with water, dried and heated. A conductive elastmer 24 such as any carbon fiber etc. is interposed for electrically communicating the counter electrode 23 and the conductive film 12.

Figure 4:
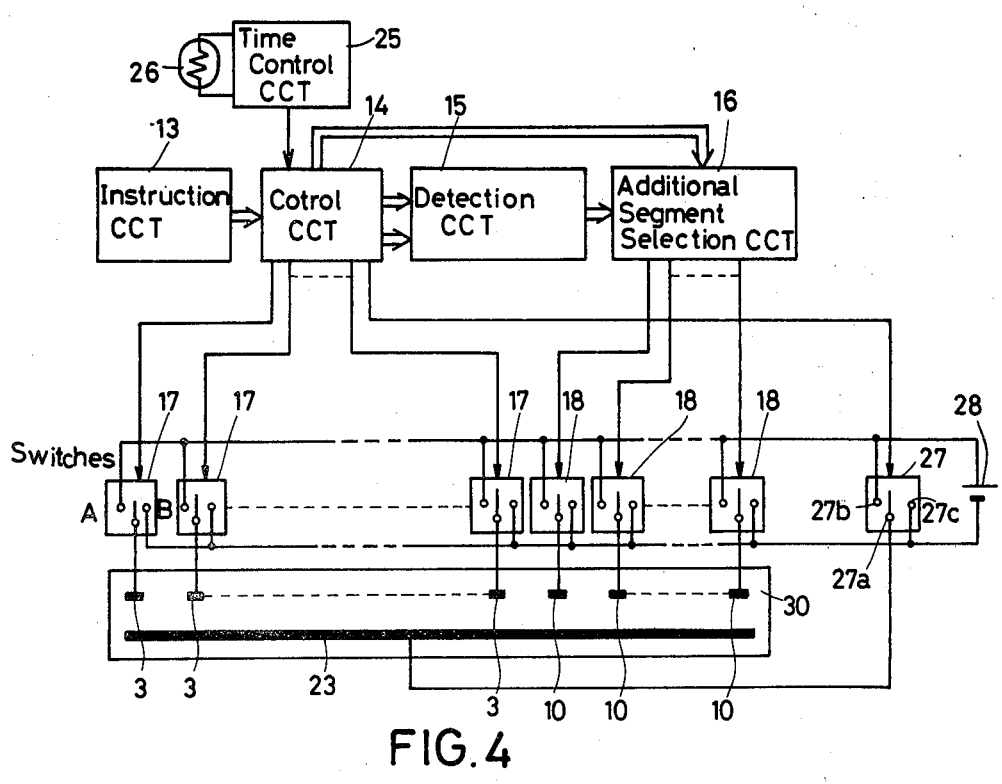
FIG. 4 shows a block diagram of a driver for driving the display cell of FIG. 3(A).

FIG. 4 shows a circuit for driving the display cell of FIGS. 3(A) and 3(B). Like elements corresponding to those of FIG. 2 are indicated by like numerals. Except as described below, operation is identical with the operation of the circuit of FIG. 2.

A switch 27 and a constant voltage source 28 replace the power switch 19, the constant voltage sources 20 and 21, and the constant current source 22. A terminal 27b in the switch 27 is connected to the terminals A of the electronic switches 17 and 18 and to the positive pole of the constant voltage source 28. A terminal 27C in the switch 27 is coupled to the terminals B of these switches 17 and 18 and to the negative pole of the constant voltage source 28. A terminal 27a in the switch 27 is tied to the counter electrode 23. Switching of terminals 27a, 27b and 27c is enabled by the control circuit 14.

A time control circuit 25 comprises a monostable-vibrator which is responsive to varied resistance of a thermister 26 depending on change of surrounding temperature of the electrochromic display cell. The monostable-vibrator varies its time constant. The circuit 25 provides switching control signals to the control circuit 14 controlling the switching time of the switch 27 by the control circuit 14 during the refreshing driving mode.

(III) The Normal Display Mode

The switch 27 is kept open and the manner in which the position of each of the switches 17 and 18 is selected is the same as described in item (I) with reference to FIG. 2.

(IV) The Refreshing Driving Mode

Each of the colored display segments 3 and the colored additional electrodes 10 is connected to the terminals A of the switches 17 and 18. Other switches 17 and 18 not driven for coloring electrode are kept open. The terminal 27a is connected to the terminal 27c so as to enable erasure.

Thereafter, each of the just erased display segments and the just erased additional electrodes is connected to the terminals B of the switches 17 and 18. The terminal 27b is connected to the terminal 27a so that these electrodes are made colored with refreshing. After completion of the refreshing driving mode, the switch 27 is made open so that the normal display mode can be enabled.

If the surrounding temperature around the display cell increases, the response of the cell becomes rapid. Therefore, if a voltage is applied to a low temperature display cell and one at an elevated temperature at an identical time, the coloration change in the elevated temperature cell is greater than that in the low temperature cell. To compensate for this non-uniform display contrast, the time control circuit 25 is responsive to temperature increase for enabling the control circuit 14 to shorten the time a voltage is applied for coloration, i.e., the connection time of the terminal 27b to the terminal 27a.

It is sufficient that the refreshing driving mode by the circuit of FIG. 4 is conducted about once every 30 minutes to maintain a good display.

The refreshing driving mode according to the present invention can be operated at regular intervals by manual procedures or a programed procedure. Since the time required to complete this mode is as short as about 1 second, this mode can be interposed between horological displays by the display cell.

In the above description, refreshing the display segments and the additional elecdrodes is done simultaneously. It should be evident that this may be done at different times. In such a case, when the refreshing mode effects erasure with a contant voltage and coloration with a constant current, the total areas of colored display electrodes and colored additional electrodes are varied, depending on the display pattern to be indicated. In order to obtain certain density of coloration change, the magnitude of the constant current source coupled to the display segments should be made larger, proportional to the areas of the respective display segments.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electrochromic display device comprising:
   display segmented electrode means comprising a layer of electrochromic material;
   additional electrode means comprising a layer of electrochromic material;
   counter electrode means opposed to the display segmented electrode means;
   electrolyte means interposed between the display segmented electrode means and the counter electrode means;
   charge absorbing means connected between said display segmented electrode means, said additional electrode means and said counter electrode means for absorbing charges present in colored display segmented electrode means and in colored additional electrode means through the counter electrode means; and
   charge adding means connected between said display segmented electrode means, said additional electrode means and said counter electrode means for adding, through the counter electrode means, charges to the display segmented electrode means and the additional electrode means from which charge is removed;
   whereby a display pattern is changed by transferring charge among the display segmented electrode means and the additional electrode means and the total charge of the colored display electrode means and the colored additional electrode means is kept constant.

2. The device of claim 1, wherein the charge absorbing means comprises a constant voltage source means and the charge adding means comprises a constant current source means.

3. The device of claim 1, wherein the charge absorbing means and the charge adding means each comprise a constant voltage source means.

4. The device of claim 1 or 3, further comprising time regulating means for regulating coloration time by the charge adding means.

5. An electrochromic display device comprising:
   display segmented electrode means comprising a layer of electrochromic material;
   additional electrode means comprising a layer of electrochromic material;
   counter electrode means opposed to the display segmented electrode means;
   electrolyte means interposed between the display segmented electrode means and the counter electrode means;
   charge absorbing means for absorbing charges present in the colored display segmented electrode means and in the colored additional electrode means through the counter electrode means; and
   charge adding means for adding, through the counter electrode means, charges to the display segmented electrode means and the additional electrode means from which charge is removed;
   time regulating means for regulating coloration time by the charge adding means, the time regulating means comprising a thermally responsive element for detecting the temperature around the display device and for providing an output for controlling the coloration time,
   whereby a display pattern is changed by transferring charge among the display segmented electrode means and the additional electrode means, and the total charge of the colored display electrode means and the colored additional electrode means is kept constant.

6. The device of claim 1, wherein the counter electrode means is composed of $WO_3$ doped with $SnO_2$.

7. The device of claim 1, wherein the counter electrode means comprises a mixture of a powder of an active material and another powder of a conductor means.

8. The device of claim 7, wherein the powder of a conductor comprises expanded graphite or active carbon.

9. The device of claim 1, wherein the counter electrode means comprises material selected from the group comprising:
   (1) Mg, Al, Zn, Cr, Fe, Ni, Sn, Pb, Tl, Ti, Zn and Ce;
   (2) a halogenide of a metal, sulfate, nitrate, perchloric acid, including $NiF_2$, $NiCl_2$, $CuF_2$, $CuCl_2$, $AgCl$;
   (3) an oxide, sulfide or selenide of a metal including $WO_3$, $CuS$, $CuSe$, $FeS$, $FeSe$, $MoO_x$, $WO_x$ (wherein x is more than 1 and not more than 3), tungsten bronze, and $Nb_2O_x$ (wherein x is more than 2 and not more than 5);
   (4) $RFe(II)[Fe(III)(CN)_6]$ wherein R is $NH_4$, H, K or Na), Prussian blue, a metallophthalocyanine complex, an iron complex, a cobalt complex, or another transition metal complex.

10. The device of claim 1, where the charge absorbing means and the charge adding means activate the display segmented electrode means and the additional electrode means at the same time.

11. The device of claim 1, wherein the charge absorbing means and the charge adding means activate the display segmented electrode means and the additional electrode means at different times.

* * * * *